United States Patent [19]

Arndt

[11] 4,373,827
[45] Feb. 15, 1983

[54] ARRANGEMENT FOR THE RIGID CONNECTION OF A DRIVEN SHAFT WITH A GRADUATED DISK OF A PRECISION MEASURING INSTRUMENT

[75] Inventor: Klaus Arndt, Zurich, Switzerland

[73] Assignee: Contraves AG, Zurich, Switzerland

[21] Appl. No.: 274,871

[22] Filed: Jun. 18, 1981

[30] Foreign Application Priority Data

Jul. 1, 1980 [CH] Switzerland .......................... 5055/80

[51] Int. Cl.$^3$ ......................... F16L 11/12; F16D 1/00; F16D 3/00
[52] U.S. Cl. .......................................... 403/24; 415/14
[58] Field of Search ....... 403/24; 33/125 T, DIG. 19; 356/152; 250/231 SE; 415/14, 118; 416/61; 116/227

[56] References Cited

U.S. PATENT DOCUMENTS

| | | | |
|---|---|---|---|
| 3,309,525 | 3/1967 | Johnson | 250/231 SE |
| 4,132,890 | 1/1979 | Garcia et al. | 250/231 SE |
| 4,246,478 | 1/1981 | Nishiyama et al. | 250/231 SE |
| 4,321,531 | 3/1982 | Marshall | 250/231 SE |

FOREIGN PATENT DOCUMENTS 4241 9/1979 European Pat. Off. .............. 403/24

*Primary Examiner*—Wayne L. Shedd
*Attorney, Agent, or Firm*—Werner W. Kleeman

[57] ABSTRACT

An arrangement for the rigid connection of a drive or driven shaft with a coding disk of an angle coding device. Arranged at the drive shaft is a one-piece compensation ring comprising a first flange for receiving and attachment of a coding disk, a second flange for securing such compensation ring to the drive shaft, and a sleeve element interconnecting the two flanges. The first flange and the sleeve element are divided into segment portions or segments by slits distributed on the periphery, whereby there are absorbed most of the radially acting forces which are caused mainly by the different coefficients of expansion of the relevant materials. The arrangement is particularly suitable for a coding disk which is rigidly connected for rotation to the drive or driven shaft and which is operatively associated with an angle coding device for the reading of the elevation or azimuth alignment movement of an observation periscope.

4 Claims, 4 Drawing Figures

ARRANGEMENT FOR THE RIGID CONNECTION OF A DRIVEN SHAFT WITH A GRADUATED DISK OF A PRECISION MEASURING INSTRUMENT

BACKGROUND OF THE INVENTION

The present invention relates to a new and improved construction of an arrangement for the rigid connection of a drive or driven shaft with a graduated disk of a precision measuring instrument, in particular for the rigid connection of a drive shaft with a coding disk formed of glass for an angle coding device of an observation periscope.

In a prior art arrangement for a precision measuring instrument according to German Pat. No. 2,140,141, there are rigidly connected for rotation or torsionally resistant, for instance, at the base of a geodetic instrument two flat or planar components having mutually different temperature coefficients. Such connection between the temperature-sensitive components is formed by a number of webs arranged perpendicular to the components and having less rigidity in radial direction and greater rigidity in axial direction. In this way, a torsion or rotation-proof and to some extent elastic connection between the components is achieved. However, such known arrangement for the connection of two flat or planar components is not suitable for connecting a graduated disk or dial with a shaft.

For a precision measuring instrument there is known from German Pat. No. 2,438,146 a graduated disk formed of glass and having the graduations or scale markings arranged on the surface externally of the neutral fiber or plane. By suitably dimensioning and arranging the graduations on the graduated disk there is achieved an almost complete compensation of the graduation or scale marker errors caused by deformation and bending. The operative connection with the actual support body or carrier and related thereto the mechanical stresses at the graduated disk are not entirely or not at all eliminated in this case.

SUMMARY OF THE INVENTION

Therefore, it is a primary object of the invention to provide an improved arrangement for the rigid connection of a driven or drive shaft with a graduated disk of a precision measuring instrument in a manner not associated with the aforementioned drawbacks and shortcomings of the prior art.

Another and more specific object of the invention is to provide an arrangement for the rigid connection of a drive or driven shaft with a coding disk formed of glass for an observation periscope, which arrangement is constructed in a particularly space-saving manner and ensures for an absolutely rigid connection of the components over a temperature range of about $-55°$ C $+105°$ C.

According to the invention these objects, and others will become more readily apparent as the description proceeds, are attained by means of a compensation ring which is rigidly connected for rotation to the coding disk on the one hand and to the drive shaft on the other hand. Such compensation ring or ring means is provided with a first flange radially directed towards the outside, and with a second flange radially directed towards the inside. The second flange is offset in axial direction with respect to the first flange. The compensation ring further contains a substantially cylinder-shaped bushing or sleeve element interconnecting both flanges. The first flange and the bushing or sleeve element are divided into different ring segments by a number of slots or slits which are distributed on the periphery.

Interpositioning the preferably one-piece compensation ring has the advantage of eliminating the concentrically acting stresses at the components, which are constructed to be rotationally symmetrical and are formed of different materials with different coefficients of expansion. Thus, there is ensured for an exact reading of the angular position of the drive or driven shaft by means of the coding device.

BRIEF DESCRIPTION OF THE DRAWING

The invention will be better understood and objects other than those set forth above will become apparent when consideration is given to the following detailed description thereof. Such description makes reference to the annexed drawings which depicts an exemplary embodiment of the invention described hereinafter in greater detail and wherein.

DETAILED DESCRIPTION OF THE PREFERRED EMBODIMENTS

Figure 1:
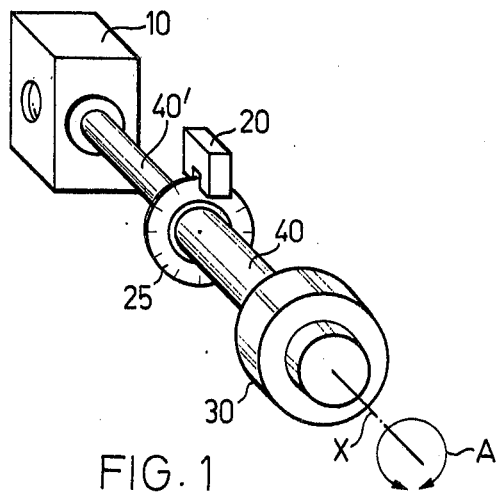
FIG. 1 is a schematic perspective view of an arrangement of an angle coding device at a drive shaft for the elevational movement of optical devices.
Figure 2:
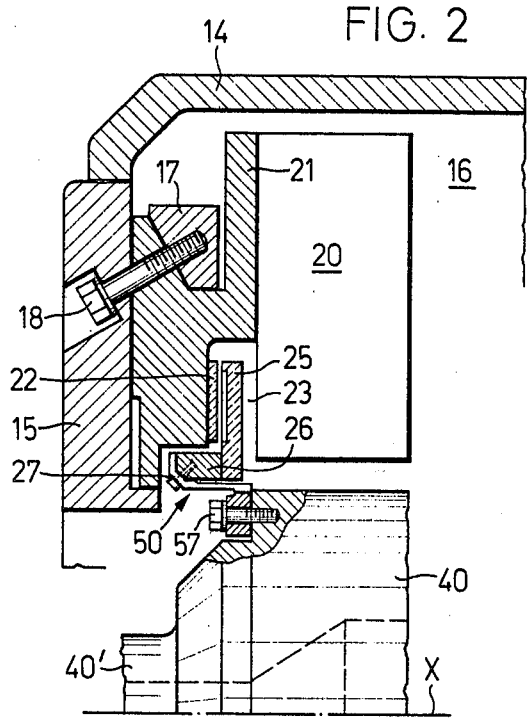
FIG. 2 illustrates on an enlarged scale a sectional view of the coding device with its coding disk attached to the drive shaft by means of a compensation ring.

Describing now the drawings, FIG. 1 shows a perspective view of a drive or driven shaft 40 having arranged at one end 40' thereof an optical device 10, which may be, for instance, an optical receiver of a here not further illustrated but conventional observation periscope. The other not particularly referenced end of the shaft 40 is provided with a schematically indicated drive unit 30 for the pivotal movement of the optical device 10 about the elevation-tilt axis X in the direction of the double-headed arrow A. For the determination of the pivotal movement of the optical device 10 or, respectively, the shaft 40, there is provided a conventional and thus schematically illustrated coding device 20 which, as shown in FIG. 2, is arranged in a recess or compartment 16 which is closable by a cover element 14 and is provided in a here not further illustrated housing. Such angle coding device 20 is operatively associated with a coding disk 25 which is rigidly mounted for rotation on shaft 40.

In FIG. 2 there is shown in enlarged scale a coding device 20 secured by any suitable means to a support or carrier element 21 which, in turn, is secured to a housing flange element 15 by means of a wedge or key element 17 and threaded bolts 18 or equivalent fastening expedients. Mounted in the housing 14, 15, likewise by any suitable means, is also the stepped drive or driven shaft 40 constructed preferably as a hollow shaft and pivotable about the tilt axis X in the direction of the double-headed arrow A by means of the drive unit 30. In a substantially ring-shaped or annular recess 23 between the support element 21 and the coding device 20 there is arranged the coding disk 25 formed, for instance, of glass and secured to an intermediate ring 26 by any appropriate means, for instance by an adhesive bond, gluing or the like. The coding disk 25 and the intermediate ring 26 are rigidly connected for rotation to the drive shaft 40 by means of a compensation ring or ring means 50, whereby such compensation ring 50 is secured to the shaft 40 by means of threaded bolts 57, or the like distributively arranged on the periphery of the shaft 40. Furthermore, the intermediate ring 26 carrying the coding disk 25 is secured to the compensation ring 50 by means of threaded bolts 27 or the like distributively arranged on the periphery of such intermediate ring 26. Moreover, there is provided in the recess 23 a schematically indicated reading element 22 attached to the support element 21 in any suitable fashion, as by adhesive bonding, and operatively associated with the coding disk 25.

Figure 4:
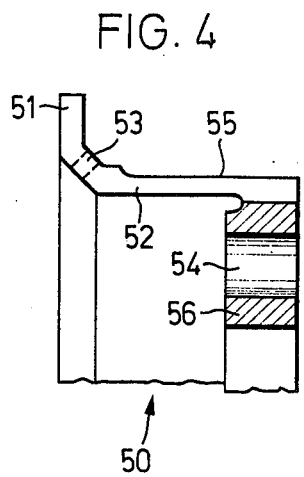
FIG. 4 is an enlarged fragmentary axial sectional view of the compensation ring.

The compensation ring shown in FIG. 4 in profile or axial sectional view in essentially Z-shaped and is constructed preferably as a one-piece element. For attachment of the coding disk 25 such compensation ring or ring means 50 is provided with a first flange 51 radially directed towards the outside and for securing such compensation ring 50 to the drive shaft 40 it is provided with a second flange 56. This second flange 56 is arranged axially offset with respect to the first flange 51 and is radially directed towards the inside. A substantially cylinder-shaped or cylindrical bushing or sleeve portion 55 connects the flange 51 with the flange 56.

Figure 3:
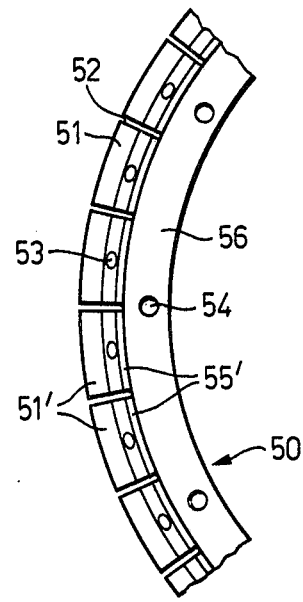
FIG. 3 is a side view of a portion of the compensation ring.

As can be seen from the ring-section shown in FIG. 3, the substantially cylinder-shaped bushing or sleeve portion or element 55 and the first flange 51 are divided into individual ring segment portions or segments 51', 55' by means of slits 52 distributed preferably evenly on the periphery. Furthermore, there are provided in the first flange 51 openings for the threaded bolts 27 and in the second flange 56 openings for the threaded bolts 57 or equivalent fastening expedients.

Due to the particular construction and arrangement of the compensation ring means 50 the radially acting forces engendered by the different coefficients of expansion of the relevant materials are mostly absorbed, since, on the one hand, there is a rigid connection of the second flange 56 with the shaft 40 for the exact transmission of the rotational movement and, on the other hand, the bushing or sleeve portion 55 and the first flange 51 which are divided into segment portions 55' and 51', respectively, serve for an essentially rigid connection with the coding disk 25.

While there are shown and described preferred embodiments of the invention, it is to be distinctly understood that the invention is not limited thereto but may be embodied and practised within the scope of the following claims. Accordingly,

What I claim is:

1. An arrangement for the rigid connection of a driven shaft with a graduated disk of a precision measuring instrument, in particular for the rigid connection of an optical drive shaft with a coding disk formed of glass for an angle coding device of an observation periscope, comprising:
    a compensation ring;
    said compensation ring being rigidly connected for rotation with the coding disk and the driven shaft;
    said compensation ring being provided with a first flange radially directed towards the outside and a second flange arranged axially offset with respect to the first flange and radially directed towards the inside;
    said compensation ring further comprising a substantially cylinder-shaped sleeve portion interconnecting said two flanges; and
    said first flange and said sleeve portion being divided into individual ring segments by peripherally distributed slits.

2. The arrangement as defined in claim 1, wherein:
    said compensation ring is secured to said driven shaft by means of said second flange; and
    said coding disk being secured to said first flange which is divided into individual ring segments.

3. The arrangement as defined in claim 2, further including:
    an intermediate ring for securing said coding disk to said first flange.

4. The arrangement as defined in claim 1, wherein:
    said compensation ring is constructed as a one piece element and has an essentially Z-shaped cross-sectional configuration.

* * * * *